United States Patent [19]
Kasahara et al.

[11] 3,849,761

[45] Nov. 19, 1974

[54] COMMUNICATION SYSTEM

[75] Inventors: Masao Kasahara, Kyoto; Toshihiko Namekawa, Kobe; Keniti Fujiwra, Amagasaki; Shigeiti Hirasawa, Amagasaki; Yasuo Sugiyama, Amagasaki, all of Japan

[73] Assignee: Mitsubishi Denki Kabushiki Kaisha, Tokyo, Japan

[22] Filed: Mar. 31, 1972

[21] Appl. No.: 240,172

[30] Foreign Application Priority Data

Sept. 17, 1971 Japan ............................... 46-72228

[52] U.S. Cl. .......................................... 340/146.1 R

[51] Int. Cl. ....................... G06f 11/00, G08c 25/00

[58] Field of Search ........... 340/146.1 R, 146.1 AJ, 340/146.1 AB; 325/41

[56] References Cited

UNITED STATES PATENTS

| | | | |
|---|---|---|---|
| 3,396,369 | 8/1968 | Brothman et al. | 340/146.1 R |
| 3,449,716 | 6/1969 | Brothman et al. | 340/146.1 R |

OTHER PUBLICATIONS

Information Theory and Reliable Communication, R. G. Gallager, John Wiley and Sons, Inc., 1968, pp. 63–70.

*Primary Examiner*—Charles E. Atkinson
*Attorney, Agent, or Firm*—Robert E. Burns; Emmanuel J. Lobato; Bruce L. Adams

[57] ABSTRACT

A threshold detector sorts each of a plurality of n-bit binary code blocks representative of redundantly encoded information into correct bits and, if present, a bit ambiguous as to information content. The latter bit is transformed into an erased word. The correct digits and erased word forming one signal sequence are registered in a shift register with a corresponding checking code. Upon detecting the erased word, a correction circuit responds to the checking code to calculate the original exact word for the erased word. The calculated word is substituted for the erased word in the register. Also the Markov type of information such as the bipolar code is similarly processed and the correction is accomplished by utilizing the nature of the information.

4 Claims, 12 Drawing Figures

COMMUNICATION SYSTEM

BACKGROUND OF THE INVENTION

This invention relates to a communication system for accurately transmitting information with errors developed during transmission reduced.

Upon transmitting the information through communication systems, the information having error content may be frequently transmitted to the receiving end under the influence of noise developed on the system. For example, with a communication system including an information source, a transmitter connected to the source, a receiver connected to a destination and a channel for connecting the transmitter to the receiver, a binary signal having a binary value of either ONE or ZERO can be provided by the information source. Then the signal is transmitted through the transmitter to the channel until it is taken out at the destination through the receiver. Under these circumstances, conventional communication systems have a fairly high probability of receiving erroneous signals at the destination such that a transmitted signal having a binary value of ZERO or ONE may be erroneously received at the destination as one having a binary value of ONE or ZERO respectively. It is highly desirable to decrease that probability to a sufficiently small value.

SUMMARY OF THE INVENTION

Accordingly it is an object of the invention to provide a new and improved communication system for accurately transmitting the information therethrough by minimizing a probability of incorrectly transmitting it.

The invention accomplishes this object by the provision of a communication system for transmitting the information, comprising, in combination, first means for sending a transmission signal for the transmission of information, the transmission signal including a multiplicity of code blocks each formed of a digital signal array or n-bit binary number and having appended thereto at least one checking code block, each of the digital signal arrays having redundancy; second means for checking the digital signal arrays in each of the transmitted code blocks so that it detects any digital signal array having a predetermined ambiguity as to information content by comparing it with its corresponding checking code block; and third means for correcting the digital signal array detected by the second means on reference to the checking code block.

The second means may preferably include a threshold detector having a threshold level for defining the predetermined ambiguity and is operative to detect the digital signal sequence having its ambiguity in the excess of the threshold level.

Advantageously, the second means may be operatively associated with fourth means for transforming the digital signal sequence detected by the same into an erased word. Then the erased word is detected by means operatively associated with the third means to be corrected to its original exact word.

The invention is equally applicable to the transmission of Markov type information including characters each having a probability of occurrence expressed by the n-ple Markov process. The correction is made on reference to the probability of occurrence of the Markov type information.

BRIEF DESCRIPTION OF THE DRAWINGS

The above and other objects, features and advantages of the invention will become more readily apparent from the following detailed description taken in conjunction with the accompanying drawings in which.

DESCRIPTION OF THE PREFERRED EMBODIMENTS

Figure 1:
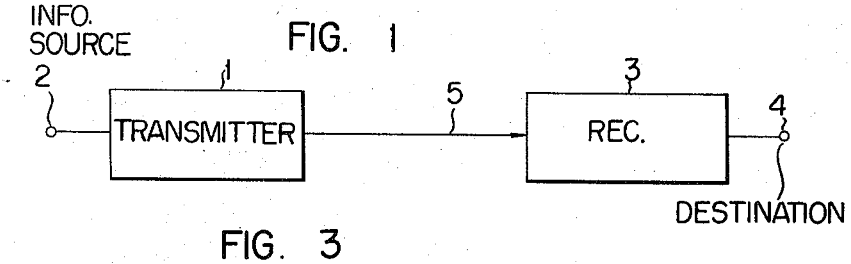
FIG. 1 is a block diagram of a communication system of the prior art type.

Referring now to the drawings and FIG. 1 in particular, it is seen that an arrangement disclosed herein comprises a transmitter 1 connected at the input to an input end or an information source 2, a receiver 3 connected at the output to an output end or a destination 4, and a channel 5 for interconnecting the transmitter and receiver 1 and 3 respectively. If a binary signal having a binary value of either ZERO(0) or ONE(1) from the information source 2 is supplied to the transmitter 1 then it is transmitted through the channel 5 to the receiver 3 until the received signal is taken out from the destination 4. Under these circumstances, the output signal appearing at the destination 4 can accurately corresponds to the signal supplied from the information source 2. Alternatively it may be a signal erroneously corresponding to the applied signal under the influence of noise introduced, for example, into the channel 5.

Figure 2:
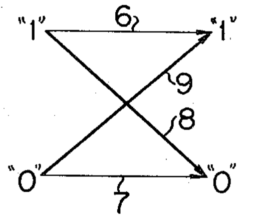
FIGS. 2 and 3 are graphs useful in explaining the operation of the communication system shown in FIG. 1.

In that case the transmitted and received signals or codes have conditional probability occurring therebetween as shown in a transition diagram of FIG. 2. In FIG. 2, straight line 6 designates a transition probability that the transmission of a code having a binary ONE value results in the correct reception of the corresponding code having the binary ONE value, which probability is normally denoted by the symbol "P(1/1)." Similarly, straight line 7 designates a transition probability of receiving a correct code with a binary ZERO value in response to the transmission of the corresponding code having a binary ZERO, which probability is normally denoted by the symbol "P(0/0)." Therefore the transmission of the binary ONE or ZERO is accurately accomplished with such a transition probability.

In addition, there is a transition probability of incorrectly transmitting the information. When a binary ONE is transmitted, a binary ZERO may be incorrectly received with a transition probability as shown at straight line 8 in FIG. 2. That transition probability is normally denoted by the symbol "P(0/1)." Also the transition between a binary ZERO transmitted and a binary ONE incorrectly received has a probability as shown at straight line 9 in FIG. 2 normally denoted by the symbol "P(1/0)." These two transition probabilities can result, for example, from noise introduced into the channel 5 as shown in FIG. 1.

Figure 3:
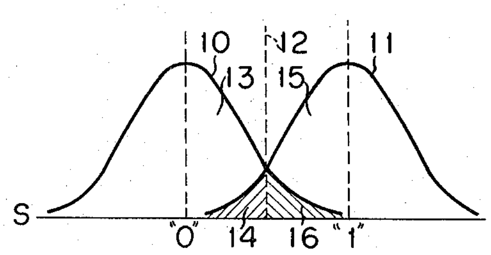

In FIG. 3 there is conceptually shown probability densities for the distribution of output levels on the receiving side of conventional signal channels, assuming that the channels are of the Gaussian binary type. In FIG. 3, curve 10 depicts an output-level distribution on the receiving side provided when binary ZERO's are transmitted to that side and forming a Gaussian distribution having a maximum value at a point of binary ZERO. Similarly, curve 11 describes an output-level distribution on the receiving side provided when binary ONE's are transmitted to that side, and forming a Gaussian distribution having a maximum value at a point of binary ONE. Vertical dotted line 12 refers to a boundary serving to determine which of binary ZERO and ONE values has reached the receiving side. If two probabilities of occurrence of binary values of ZERO and ONE are equal to each other, the vertical line 12 is positioned to pass through a point of intersection of both curves 10 and 11 substantially equidistant from a pair of vertical dotted lines passing through the maximum points on the curves 10 and 12 respectively.

It is seen that the lefthand side as viewed in FIG. 3 of the vertical dotted line 12 has a pair of probability domains 13 and 14 formed between the curve 10 and the reference axis S and separated by the knee portion of the curve 11 extending below the adjacent portion of the curve 10. Similarly, on the righthand side of the vertical line 12 another pair of probability domains 15 and 16 are formed between the curve 11 and the reference axis S and separated by the knee portion of the curve 10 extending below the adjacent portion of the curve 11. As shown in FIG. 3, the lower domains 14 and 16 are hatched.

From the foregoing, it will readily be understood that the domains 13, 14, 15 and 16 correspond to the transition probabilities P(0/0), P(0/1), P(1/1) and P(1/0). It is to be noted that, as shown at the hatched domains 14 and 16 in FIG. 3, communication systems of the prior art type have been fairly high in a probability of effecting erroneous transmission therethrough.

The invention contemplates to minimize a probability of erroneous transmission as above described in communication systems.

In order to transmit the information, the invention utilizes digital signal sequences each having redundancy. This is accomplished by encoding M piece of information by n-bit binary numbers where $M<2^n$ and $M,n$ are integers. Each n-bit binary code words corresponding to one of the M pieces of information is called an information code block and the received signal of the communication system according to the invention is a sequence of information code blocks and at least one checking code block. Checking code blocks are n-bit binary numbers code words selected from a subset of n-bit binary code words not including the subset of information code blocks.

Further the invention comprises the use of a signal channel having a function of detecting any error This function is to sense or detect that status in which any incorrect transformation of information is apt to be effected whereupon the particular coded word is transformed into a transformed signal block or erased word. Then the transformed erased word is corrected in accordance with the nature of the associated digital signal sequence whereby it is returned back to the original exact coded word.

Figures 4, 5:
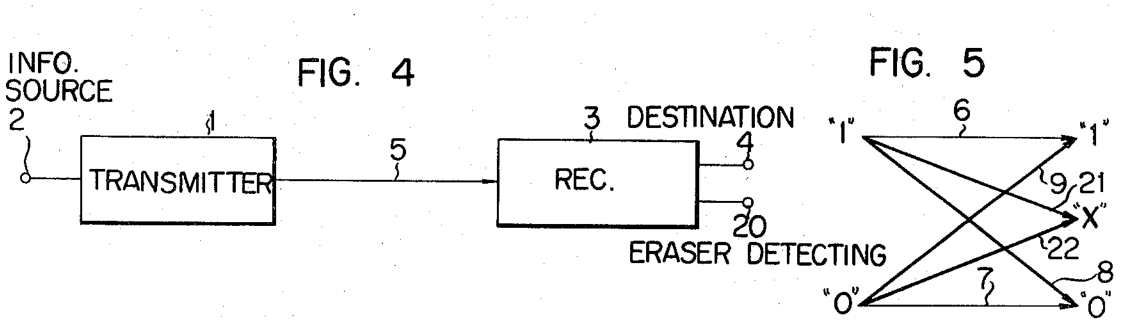
FIG. 4 is a block diagram of the basic form of the invention.

Referring now to FIG. 4, there is illustrated the generalized form of the invention. The arrangement illustrated is identical to that shown in FIG. 1 except that the receiver 3 has connected thereto an eraser detecting end 20 for detecting any eraser. The receiver 3 is adapted to respond to the reception of a coded word having ambiguous information content to produce an output "X" at the detecting end 20.

It is assumed that binary coded signals having the binary value of either ZERO or ONE from the information source 2 are successively provided at the destination or output end 4. Under the assumed condition, the arrangement has, in addition to transition probabilities of P(1/1), P(0/0), P(0/1) and P(1/0) as above described in conjunction with FIG. 2, a pair of transition probabilities of receiving the output "X." All those probabilities are shown in FIG. 5 wherein like reference numerals designate the components identical to those illustrated in FIG. 2. As shown in FIG. 5, straight line 21 depicts a probability of transition occurring between a transmitted code having a binary ONE value and the output "X." This transition probability is normally denoted by the symbol "P(X/1)." Straight line 22 describes a probability of transition occurring between a transmitted code having a binary ZERO and the output "X" and normally denoted by the symbol "P(X/0)."

Figure 6:
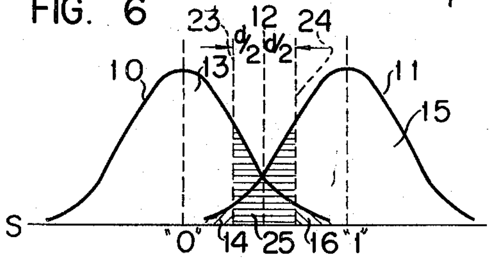
FIGS. 5 and 6 are graphs similar to FIGS. 2 and 3 respectively but illustrating the invention.

In FIG. 6 wherein like reference numerals designate the components identical to those shown in FIG. 3, there is illustrated the probability densities for the distribution of output levels on the receiving side for the arrangement of FIG. 4, forming also Gaussian distributions similar to those shown in FIG. 3. A pair of vertical dotted lines 23 and 24 are shown in FIG. 6 as being drawn on both sides of the vertical dotted line 12, defining a domain 25 in which the signal "X" is provided at the detecting end 20. More specifically the domain 25 horizontally hatched is defined by both lines 23 and 24 and under both curves 10 and 12. If two probabilities of occurrence of binary ZERO and ONE values are equal to each other, they both lines 23 and 24 are spaced away in the opposite directions from line 12 by equal distances of $d/2$. In other respects, the graph is identical to that shown in FIG. 3.

In the domain 25, the output "X" is produced in response to a transmitted binary number whose value has been determined to be incorrect or indeterminate That is, such a binary number has an ambiguity and the domain 25 may be called a null zone.

In the arrangement as shown in FIG. 4, if at least one output "X" appears at the detecting end 20 for a single coded word to indicate that the coded word include at least one ambiguous code then the output "X" developed at the destination 4 is forced to be transformed into a corresponding erased word followed by its correction as will be described hereinafter. Thus the erroneous transmission of information is reduced in the domain 25 where the "X" output is received and consequently, it may mainly occur in the domains 14 and 16 reduced in area as compared with those shown in FIG. 3 with the result that the probability of incorrect transmission is minimized or sufficiently decreased.

In spite of whether or not signals transmitted along the channel 5 (see FIG. 5) are modulated, detection of any eraser can be accomplished by properly setting a threshold of a base-band output on the side of the receiver 3, and using a null-zone detector. Alternatively, as long as the channel includes modulation means, the same may cooperate with any suitable level detector for detecting an instantaneous level of the associated carrier or the like to perform the required function of detecting an error The purpose of using a set of digital signal sequences having the redundancy is to decrease both the required transmission band and direct current component, to stabilize the periodic characteristics (such as the bit and frame), to decrease the effect of noise on the system and so on.

The communication system according to the invention can be broadly sorted into two types in accordance with the manner in which a coded word having ambiguous information content is transformed into an erased word with an output indicating the detection of an eraser is corrected to the original exact word, one of the two types is to use the digital signal comprising a sequence of information code blocks having appended thereto at least one checking code block. In this case, the correction is effected on reference to the associated checking code. The other type is to use, as the digital signal sequence, Markov type codes having generally known probability of occurrence of each character or code involved expressed by the n-ple Markov process. In these Markov type codes, that code word following each code word is of the kind appearing with a stochastic regularity. Thus the transformed erased word is corrected in accordance with that stochastic regularity.

The first type of communication system as above outlined will now be mathematically described. It is assumed that a set V is composed of a multiplicity of n-bit digital signal sequences each having redundancy and called an information coded word or a code block. The code block can be expressed, for example, by $$w = (a_1 a_2, , , a_N)$$

where $a_i = 0, 1$

Then S information code blocks for example $w_1 w_2 \ldots w_s$ form a sequence or unit of digital signals which has, in turn, suffixed thereto a checking code block $w_c$ to form an error-in-unit detecting code $W$. This error-in-unit detecting code can be vectorially expressed by $$W = (w_1 w_2 \ldots w_s w_c).$$

Also it is assumed that in a $k$-th information code block $w_k = (ak_1\ ak_2 \ldots ak_N)$ the output "X" as above described called an "eraser" is generated for an $i$-th digital digit $(ak_L)$ of $w_k$. Then at least one portion of the code block $w_k$ is properly transformed into an erased word $w'_k$ so as to hold the relationship.

$$w'_k \notin V$$

In general, the digital signal array has a mode expressed by a PLUS(+) or a MINUS(−). Assuming that for each mode there are different code blocks whose number is equal to L, a zero 0 and integers 1, 2, L-1 are assigned to these code blocks respectively. If any code block $w_i$ has assigned thereto an integer having a value of $v(w_i)$, then that integer assigned to the error-in-unit detecting code block $w_c$ is preselected to be of a value $v(w_c)$ satisfying the following equation:

$$v(w_c) \sum_{i=1}^{s} v(w_i) = 0 \text{ mod. } L$$

The information code block $w_k$ having an eraser occurring therein has a true value $v(w_k)$ as readily determined in accordance with the following relationship $$v(w_k) + \sum_{i=1}^{s}{}' v(w_i) + v(w_c) = 0 \text{ mod. } L$$

where $$\sum_{i=1}^{s}{}'$$

$v(w_i)$ means the total sum of the $v(w_i)$'s for i's having values of 1, 2, . . . $s$ except for $i=k$. Then the eraser output "X" as above described causes the erased word $w'_k$ to be corrected to the original code block $w_k$ in accordance with the value $v(w_k)$ thus determined.

Figure 7:
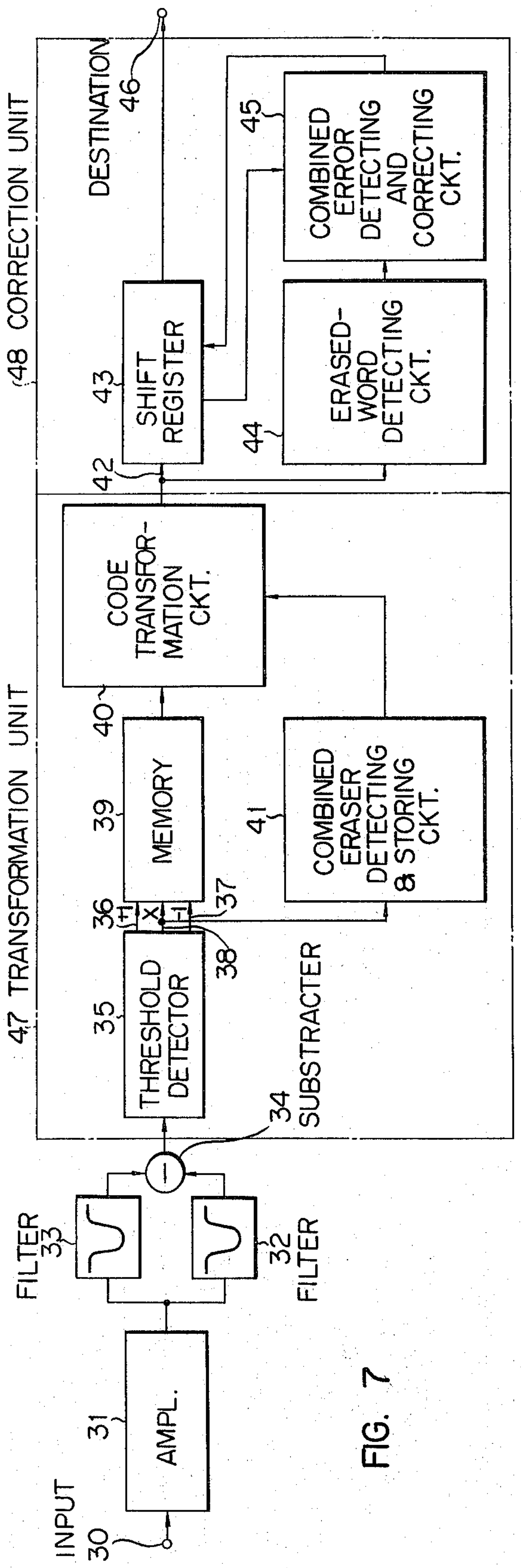
FIG. 7 is a block diagram of a communication system constructed in accordance with the principles of the invention.

Referring now to FIG. 7, there is illustrated a communication system of the first type as above described and constructed in accordance with the principles of the invention. It is assumed that the arrangement illustrated is operated with binary signals having the binary value of either ZERO or ONE and, of course, having the aforementioned redundancy. For example, with each information code block formed of 6 bits, one can consider $2^6$ code blocks as listed in the following Table I.

Table I

| Binary Code Block |
|---|
| 0 0 0 0 0 0 |
| 0 0 0 0 0 1 |
| 0 0 0 0 1 0 |
| . . . . . . . |
| . . . . . . . |
| . . . . . . . |
| 0 0 0 1 1 1 |
| . . . . . . . |
| . . . . . . . |
| . . . . . . . |
| 1 1 1 0 0 0 |
| . . . . . . . |
| . . . . . . . |
| 1 1 1 1 1 1 |

Among them, those binary code blocks enclosed with broken rectangle form coded words for use in transmitting the information while all the remaining binary numbers are omitted. That is, the binary information code blocks within broken rectangle form digital signal units useful in this case while a required erased word or transformed signal block is selected from the remaining code blocks as explained hereinafter.

In the arrangement of FIG. 7, the abovementioned coded words from an input end 30 are successively applied to an amplifier 31 connected to a pair of bandpass filters 32 and 33 interconnected in parallel. The words are formed of different combinations of two dissimilar frequencies one of which expresses the binary ZERO's and the other frequency means the binary ONE. The band pass filter 32 has the integration characteristic and is operative to pass the frequency for the binary ZERO therethrough to provide a direct current (dc) component as determined by the waveform of the applied signal. The bandpass filter 33 is identical in operation to the filter 32 except that the frequency for the binary ONE is adapted to pass therethrough. Both filters 32 and 33 are connected at the outputs to a subtracter 34 where the dc components from the filters 32 and 33 are added to or subtracted from each other.

Figure 8:
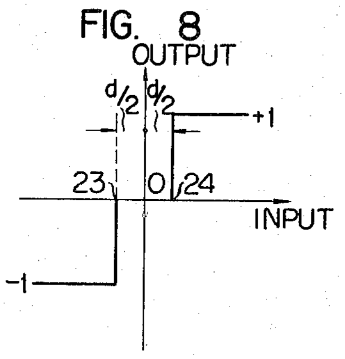
FIG. 8 is a graph illustrating the input-to-output characteristic of the threshold detector shown in FIG. 7.

Then the output from the subtracter 34 is supplied to a threshold detector 35. The threshold detector 35 has its input-to-output characteristic such as shown in FIG. 8 wherein an input is plotted as the abscissa against an output as the ordinate. As shown, the detector 35 includes a pair of threshold levels 23 and 24 corresponding to lines 23 and 24 as shown in FIG. 6. If an information source (not shown) connected to the input end 30 has a probability of occurrence of a binary ONE equal to a probability of occurrence of a binary ZERO then both threshold levels 23 and 24 are equidistant from the origin 0 (see FIG. 8). These distances between both levels and the origin may be of $d/2$ as is above described in conjunction with FIG. 6.

In operation, when that signal correctly corresponding to the binary ONE supplied from the input end 30 has passed through the bandbass filter 33, the detector 35 receives a high input in excess of its threshold level 24 to deliver an output with a binary value of PLUS ONE to a first conductor 36. With a binary ZERO supplied from the input end 30, the passage of the corresponding correct signal through the filter 32 causes the detector 35 to have applied thereto an input negatively exceeding the threshold level 23 to deliver an output having a binary value of MINUS ONE to a second conductor 37. On the other hand, if the substracter 34 output level is developed in the domain or the null zone 25 (see FIG. 6) to have such ambiguity that it cannot be determined to correctly correspond to the original binary ZERO or ONE, the threshold detector 35 develops the output "X" called an "eraser."

The three conductors 36, 37 and 38 are connected to a memory circuit 39 subsequently connected to a code transformation circuit 40. The conductor 38 is also connected to the code transformation circuit 40 through a combined eraser detecting and storing circuit 41. The memory circuit 39 is operative to successively receive the outputs on the three conductors 36, 37 and 38 until a single code block formed of the received outputs, in this case, six bits is stored therein. Each time the memory circuit 39 has completed storage of each code block, the circuit 39 supplies the content stored therein to the code transformation circuit 40. The output "X" on the conductor 38 is also applied to the combined eraser detecting and storing circuit 41. This circuit 41 is operative to detect whether or not the "X" representative of ambiguous output or outputs is or are included in that code block just stored in the memory circuit 39 and to store the result of detection. Each time one code block terminates, the circuit 41 supplies a transformation signal C to the code transformation circuit 40. If the particular code block includes the "X" output as determined by the combined detecting and storing circuit 41 then the latter supplies a transformation signal C for example in the form of a binary ONE to the transformation circuit 40 where the associated code block supplied from the memory circuit 39 is forcedly transformed into a corresponding erased word or transformed signal block for example in the form of a binary 0 0 0 0 0 0. Then this erased word or transformed signal block, is delivered to a conductor 42.

Alternatively, if the code block includes no "X" as determined by the circuit 41 then a transformation signal C having for example a binary ZERO is supplied to the code transformation circuit 40 where the code transformation is prevented thereby permitting the particular code block supplied by the memory circuit 39 as it stands to be delivered to the conductor 42.

In FIG. 7 the conductor 42 is shown as being connected to both a shift register 43 and an erased-word detecting circuit 44. The shift register 43 has registered therein a single error-in-unit detecting code as a whole as above described. Such a code may be formed, for example, of five serially disposed code block suffixed with a single checking code, each of the first five code blocks including six bits. The detecting circuit 44 is adapted to detect an erased word that may appear on the conductor 42 to apply a corresponding output to a combined error detecting and correcting circuit 45 also connected to the shift register 43. The detecting circuit 44 is commercially available.

When the output from the code transformation circuit 40 on the conductor 42 includes an erased word as determined by the detecting circuit 44, the combined error detecting and correcting circuit 45 is operative to respond to the associated checking code supplied thereto from the shift register 43 to calculate an exact code word to replace the transformed erased word. Then the exact code thus calculated is supplied to the shift register 43 where the transformed erased word is changed to the original exact word. Thereafter the word thus corrected is supplied to a destination or an output end 46.

In the arrangement of FIG. 7, it will be seen that the threshold detector 35, the memory circuit 36, the code transformation circuit 40 and the combined eraser detecting and storing circuit 41 form a transformation unit shown enclosed with broken rectangle 47 to produce an erased word in response to an ambiguous signal output X from the threshold detector 35. Similarly the shift register 43, the erased word detecting circuit 44 and an error detecting and correcting circuit 45 form a correction unit shown enclosed with another broken rectangle 48 to correct a transformed erased work to its original exact word.

As above described, digital signal sequences have the modes called "PLUS" and "MINUS." It is assumed that, for a given sequence of five code blocks, the number L of different code blocks for each mode has a decimal value of 10. Then, the first, second, third, fourth and fifth code blocks have assigned thereto decimal numbers 1, 3, 8, 2 and 5 respectively. Under the assumed condition, it will be appreciated that the associated checking code block has assigned thereto a decimal number of nine corresponding to the sum of those assigned numbers with a modulus of 10 as will readily be understood from the mathematical description as above made. Under these circumstances, if the signal "X," indicating information content ambiguity is detected for at least one digit of the third code block. Then the third code block is transformed into an erased word or transformed signal block represented, for example, by a binary number of 0 0 0 0 0 0. FOllowing this, the correcting circuit 45 calculates the sum of the assigned numbers for all the code blocks other than the assigned number for the third code block which is unknown in this case. The result of the calculation is the decimal number "1". The circuit 45 continues to calculate the unknown assigned number for the transformed erased word from the decimal number of 9 for the checking code block to obtain a decimal number of 8.

Then the result of the calculation is supplied to the shift register 43 where the third code block is changed to its original exact one.

The first type of communication systems according to the invention as above mentioned will now be described in conjunction with the transmission of paired selected ternary(which is abbreviated to "PST") codes. Any information source for providing messages in the form of binary numbers is encoded into the PST codes in accordance with the rule listed in the following Table II:

Table II

| channel | Encoding of Information source to PST Codes: Code in Information Source | | Mode + | | Mode − | | Number of Different Code blocks for Each Mode L |
|---|---|---|---|---|---|---|---|
| | 0 | 0 | − | + | − | + | 0 |
| | 0 | 1 | 0 | + | 0 | − | 1 |
| | 1 | 0 | + | 0 | − | 0 | 2 |
| | 1 | 1 | + | − | + | − | 3 |

Also upon transmitting the PST codes, through the first type of communication systems, signals involved are transformed as shown in the following Table III:

Table III

| Sorting | Transformation of Signals Signal status | | | | |
|---|---|---|---|---|---|
| *a* | 0 | 10(2) | 01(1) | 11(3) | 10(2) |
| *b* | 0 0 | 1 0 | 0 1 | 1 1 | |
| *c* | − + | + 0 | 0 − | + − | + 0 |
| *d* | − + | X 0 | 0 − | + − | + 0 |
| *e* | − + | + + | 0 − | + − | + 0 |
| *f* | − + | + 0 | 0 − | + − | + 0 |
| *g* | + | + | − | + | + |

In the above Table III, the first row denoted by the reference character *a* includes the values of the "L" listed in Table II in the form of binary numbers and also in the form of decimal numbers parenthesized. The second row *b* includes binary signals from the information source and the third row *c* includes a digital signal sequence or unit to be transmitted and into which the binary signals in the second row *b* are transformed in accordance with Table II. The fourth row *d* includes those codes received by the associated receiver in accordance with the conditional probabilities as illustrated in FIG. 5, the fifth row *e* includes intermediate codes having erased words after the reception of the codes included in the row *d* and prior to error correction, and sixth row *f* includes the desired codes produced after the correction has been effected in accordance with the invention. Finally the seventh row *g* indicates the modes for the code blocks included in the digital signal unit.

In Table III, it is noted that the final signal formed of the ninth and tenth codes provides a checking code block. The code block including these checking codes has its value of $v(w_c)$ calculated at two(2) in accordance with the equation $$v(w_c) + 0 + 2 + 1 + 3 = 0 \quad \text{mod. } 4$$

Therefore that code block in the row *d* of Table III including an eraser has been transformed into an erased word shown in the row *e* by using a code not listed in Table II. As above described in conjunction with FIG. 7, the associated receiver having the error correcting function detects the transformed code and then calculates the true value of the erased word through the arithmetical addition operation with a modulus of 4. Then the value of the erased word thus calculated is used to accomplish the correction as shown in the row *f* of Table III.

In the fourth row d of Table III, the third code is illustrated as having been received as the signal "X". Under these circumstances, the third and fourth codes are transformed in the codes "+" and "+" as shown in the row *e*. The process just described is repeated to detect that erased word and calculate an assigned number or true value $v(w_2)$ of the erased word in accordance with the equation $$\mathbf{0} + v(w_2) + \mathbf{1} + \mathbf{3} + \mathbf{2} = \mathbf{0} \quad \text{mod. } 4$$

providing $v(w_2) = 2$ for correction.

If it is assumed that only one eraser occurs in the single code block then it is possible to use the checking code including a single digit for purpose of correction. More specifically, by causing that ambiguous code having an eraser in the particular code block to coincide with the remaining code in the same block, an erased word is always provided with the result that it is required only to append the checking code to an even- or odd-numbered code.

The second type of communication systems as already outlined will now be described, by way of example, in terms of the bipolar code used with the invention. However it is to be understood that the invention is equally applicable to pseudo value three-value codes such as the poly-bipolar code, partial response code, etc. and to other multi-value codes as long as the digital signal sequences used have the required redundancy, say in the form of any of those codes supplied by the Markov type information sources.

Figure 9:
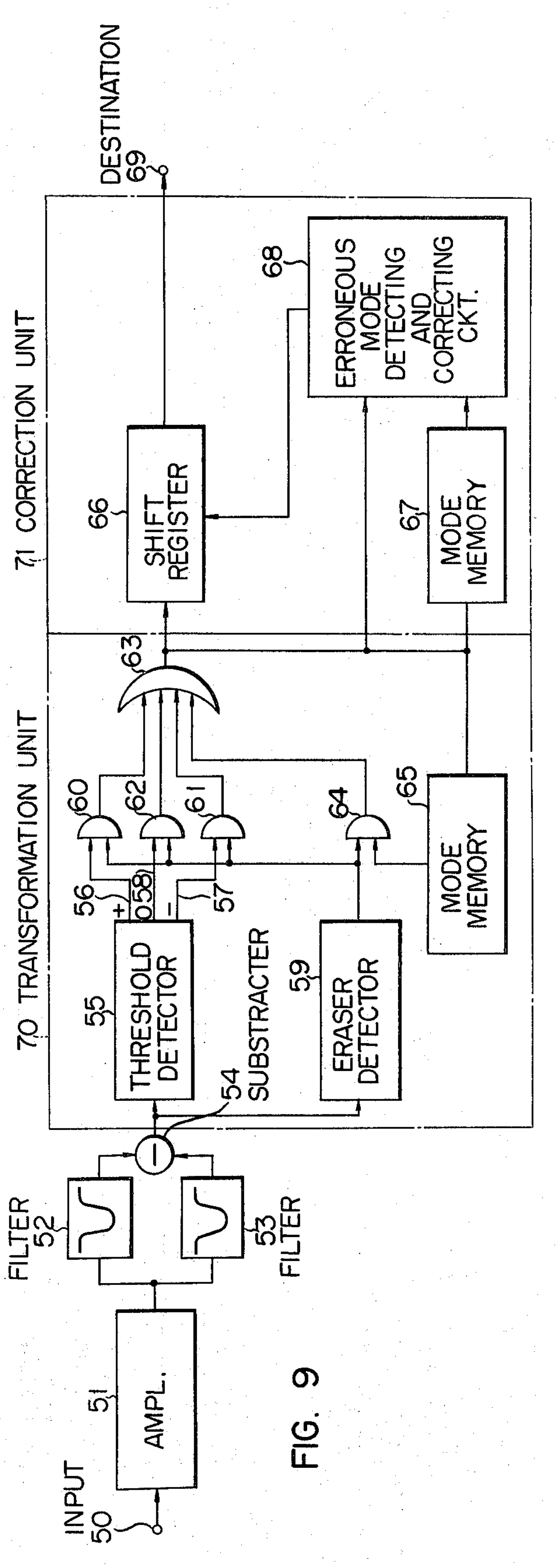
FIG. 9 is a block diagram of a modification of the invention.

Referring now to FIG. 9, there is illustrated another form of the invention applied to the bipolar code as above mentioned. As is well known, the bipolar code is composed of PLUS(+), ZERO(O) and MINUS(−) signs with ZERO sign disregarded, the bipolar code is arrange to have each PLUS sign necessarily followed directly by MINUS sign to provide the Markov type information.

In an arrangement as shown in FIG. 9, an input 50 supplies to an amplifier 51 a message formed of PLUS signs in the form of signals having a frequency of $f_1$, MINUS signs in the form of signals having a frequency of $f_2$ and ZERO sign expressed by the absence of any signal. After being amplified by the amplifier 51, the message signal is applied to a pair of parallel band pass filters 52 and 53 having the integration characteristic. The band pass filter 52 permits the signal with the frequency of $f_1$ corresponding to PLUS sign to pass therethrough and provides a dc component as determined by the waveform of that signal while the band pass filter 53 is operative to select the signal with the frequency of $f_2$ corresponding to MINUS sign to provide a dc component as determined by the waveform of that signal. Both filters 52 and 53 are connected to a subtractor 54 where the dc component outputs from the filters 52 and 53 are added to or subtracted from each other.

Figure 10:
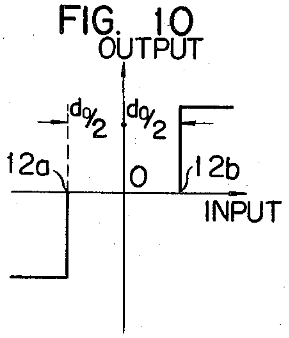
FIG. 10 is a graph illustrating the input-to-output characteristic of the threshold detector shown in FIG. 9.

Then the output from the subtractor 54 is supplied to a threshold detector 55 having the input-to-output characteristic shown in FIG. 10 wherein an input is plotted in abscissa against an output as the ordinate. As shown in FIG. 10, the threshold detector 55 has a pair of threshold levels 12*a* and 12*b* on both side of the origin 0 where the input is null. The thresholds are equidistantly spaced away from the origin with distances therebetween equal to $d_0/2$. If that signal corresponding to PLUS sign passes through the filter 53, the detector 55 has applied thereto an input in excess of the threshold level 12*b* to deliver a PLUS output to conductor 56. On the other hand, the passage of that signal corresponding to MINUS sign through the filter 52 causes the threshold detector 54 to be applied with an input negatively exceeding the threshold level 12*a*. Therefore the detector 55 supplies a MINUS output to a conductor 57. Further when a signal corresponding to ZERO sign is developed at the input end 50, the threshold detector 55 has applied thereto an input having a value between the two threshold levels 12*a* and 12*b* thereby providing a ZERO output to a conductor 58.

Figure 11:
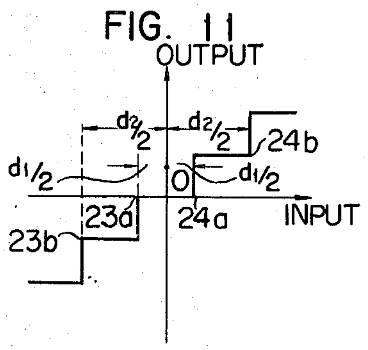
FIG. 11 is a graph similar to FIG. 10 but illustrating the eraser detector shown in FIG. 9.

The subtracter 54 is also connected to an eraser detector 59 formed of a threshold detector and having the input-to-output characteristic as shown in FIG. 11 where an input is again plotted as the abscissa against an output as the ordinate. As shown in FIG. 11, the detector 59 has one pair of threshold levels 23*a* and 24*a* disposed on both sides of the origin 0 with equal distances of $d_1/2$ therebetween, and another pair of threshold levels 23*b* and 24*b* spaced on opposite sides of the origin 0 by equal distances of $d_2/2$ where $d_2$ is greater than $d_1$.

The threshold detector 59 provides a stepped output at each of the threshold levels 23*b*, 23*a*, 24*a* and 24*b*. With any one of the correct signals corresponding to the PLUS, ZERO and MINUS signs developed at the input 50, the detector 59 has applied thereto an input whose level is equal to or higher than the level 24*b*, between the levels 24*a* and 23*a* or negatively exceeds the level 23*b*. This results in the detector 59 providing no output in the negative direction, as the case may be, resulting in the production of no output. Alternatively, when any signal having amibiguous information content appears at the input end 50, the detector 59 is receptive of an input having a level put between the levels 24*a* and 24*b* or between the levels 23*a* and 23*b* whereupon the detector provides an output "X" indicating an eraser.

Referring back to FIG. 9, the conductors 56, 57 and 58 are respectively connected to one input of AND gates 60, 61 and 62 and the other inputs are connected to the output of the eraser detector 59. The AND gates 60, 61 and 62 include respective outputs connected to individual inputs of an OR gate 63. The OR gate 63 includes another input connected to an output of an "AND" gate 64 which, in turn, includes one input connected to the output of the eraser detector 59 and the other input connected to a mode memory circuit 65.

When the eraser detector 59 provides an output "X" indicating the presence of an ambiguous signal, the AND gates 60, 61 and 62 are operated to prevent the outputs on the conductors 56, 57 and 58 from passing through the associated gates while the AND gate 64 permits an output from the mode memory circuit 65 to pass therethrough. The mode memory circuit 65 is adapted to store a mode, either PLUS or MINUS, immediately prior to providing the particular output "X" by the detector 59 which will be described hereinafter. In this case, after a PLUS output has passed through the OR gate 63, another "X" may be continuously provided by the detector 59 to cause the OR gate 63 to pass again a PLUS output therethrough. With ZERO sign disregarded this means that two "X" outputs are continuously provided by the eraser detector 59 which is against the transition rule for the information source of Markov type. This is, that "X" output following the first "X" output indicates the presence of an erased word.

The OR gate 63 is shown in FIG. 9 as being connected to the mode memory circiut 65 for the purpose of storing therein those modes provided by the OR gate 63 immediately prior to providing an "X" output from the detector 59.

The OR gate 63 is also connected to a shift registor 66, another mode memory circuit 67 and a combined erroneous mode detecting and correcting circuit 68 which is commercially available. The mode memory circuit 67 is then connected to the detecting and correcting circuit 68, which is, in turn, connected to the shift registor 66 subsequently connected to an output terminal 69.

The shift register and memory circuit 68 and 67 respectively register and stores the output mode provided by the OR gate 63 respectively. The error detecting and correcting circuit 68 responds to the outputs from the OR gate and memory circuit 63 and 67 respectively to detect and correct an erased word included in the output from the OR gate 63 whenever the presence of the erased word is determined by the circuit 68. Then the corrected word is supplied to the shift register 66 as in the arrangement of FIG. 7.

As in the arrangement of FIG. 7, the components 55, 59, 60, 61, 62, 63, 64 and 65 form a transformation unit generally designated by the reference numeral 70 to transform any ambiguous signal into an erased word, while the components 66, 67 and 68 form a correction units generally designated by the reference numeral 71 to correct the erased word to the original exact word.

Upon processing the bipolar codes by the arrangement of FIG. 9, the transformation of signals is accomplished in accordance with the following Table IV.

TABLE IV

| Sorting | Transformation of Signals Signal states |
|---|---|
| a | 1 0 1 0 0 0 1 0 1 |
| b | + 0 − 0 0 0 + 0 − |
| c | + 0 X 0 0 0 + 0 − |
| d | + 0 + 0 0 0 + 0 − |
| e | + 0 − 0 0 0 + 0 − |

In Table IV, a first row identified by the reference character a includes the binary information to be transmitted, and a second row *b* includes a digital signal sequence or unit transformed into the form of bipolar codes by the associated transmitter. A third row *c* includes those codes obtained when the digital signal sequence unit in the row $b$ has been received by the associated receiver in accordance with the conditional transition probability as shown in FIG. 5. A fourth row $d$ includes intermediate codes after the codes in the row $c$ have been received and prior to correcting any error or errors and a fifth row $e$ includes the resulting codes corrected by the arrangement of FIG. 9 according to the invention.

In Table IV it is seen that an "X" output is produced for a third code in the third row C. That "X" output is transformed into a code value being not equal to "ZERO" just previous thereto, that is to say, a sign identical to the first PLUS sign as shown in the fourth row $d$. Then the combined erroneous mode detecting and correcting circuit 68 detects the third code transformed into a code with PLUS sign and then "sees" the succeeding code being not equal to "ZERO," that is to say, the seventh code with PLUS sign thereby correcting the third or incorrect code to its original exact code with MINUS sign so as to fulfill the rule for the bipolar code.

From the foregoing it will be appreciated that, with the bipolar code used, an error in any code can be simply corrected without the necessity of employing a checking code as previously described in conjunction with FIG. 7.

Figure 12:
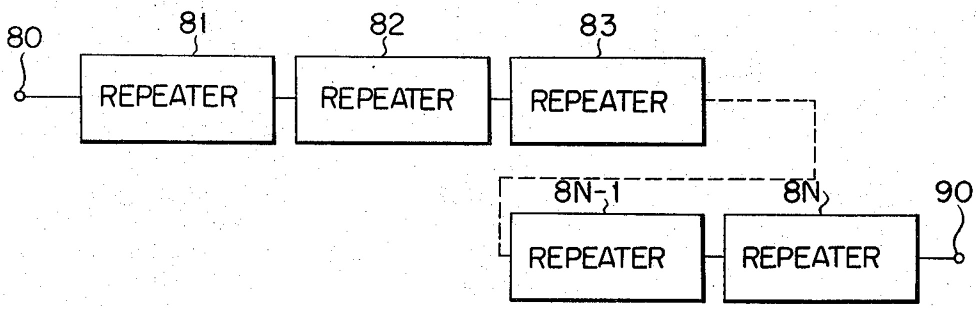
FIG 12 is a block diagram of a relaying line utilizing the invention.

The invention is effectively applicable to any communication system including a plurality of regenerative repeaters as shown in FIG. 12. In FIG. 12, a plurality of regenerative repeaters 81, 82, . . . , 8N-1 and 8N are disposed at spaced locations and connected to one another through transmission lines between an input and an output end 80 and 90 respectively. Among them the first and last repeaters 81 and 8N respectively include the mechanism of transforming any ambiguous code into an erased word and have the function of correcting the erased word to its original exact coee. Both repeaters 81 and 8N comprise the arrangement as shown in FIG. 7 or 9 as it stands. The remaining repeaters 82 through 8N-1 do not perform the correction operation and are of conventional design. Such repeaters may be, for example, formed of the arrangement as shown in FIGS. 7 or 9 but having the correction unit 48 or 71 omitted therefrom.

From the foregoing it will be appreciated that the invention reduces the possibility of and therefore a probability of effecting any incorrect transmission because it has the function of detecting an eraser. Thus the correct transmission becomes possible to be effected.

While the invention has been illustrated and described in conjunction with a few preferred embodiments thereof it is to be understood that various changes and modifications may be resorted to without departing from the spirit and scope of the invention. For example, while the invention has been described in terms of the binary code it will readily be apparent to those skilled in the art that the invention should not be limited thereby or thereto and that it is equally applicable to m-pluralized codes including multiple values. Also, for alphabetical characters, there is known a probability of character correlation following each character so that messages composed of alphabetical characters belong to the category of the Markov type information. Therefore an arrangement such as shown in FIG. 9 may be effectively used to transmit alphabetical messages with the transmission errors significantly decreased. Further the invention is equally applicable to channels having the received signals occurring in unsymmetrical relationship therein. In the latter case, the distances between the vertical lines 23 and 12 and between the lines 24 and 12 shown in FIG. 6 may be properly selected to be different from each other.

What we claim is:

1. A communications system comprising, a plurality of signal repeaters having a first signal repeater receptive of a transmitted signal, a sequence of repeaters receptive of an output signal from a previous repeater and a last repeater, said received signal corresponding to a sequence of information code blocks and at least one checking code block, each information code block being an n-bit binary coded word corresponding to a redundantly encoded piece of information selected from a subset of a set of all n-bit binary code words, and said checking code block being an n-bit binary code word selected from a subset of n-bit binary code words not including said subset of information code blocks, said last repeater comprising first detection means receptive of said signal to develop output signals corresponding to a binary one signal, binary zero signal or an ambiguous signal ambiguous as to logic content thereof, first memory means receptive of said first detector output signals for storing said first detector output signals therein, circuit means receptive of said first detector output signal corresponding to said ambiguous signal levels to store said first detector output signal and develop a first control signal in response thereto, a transformation circuit receptive of said first control signal and said first detector output signals stored in said first memory means for transforming under control of said first control signal an information code block having an ambiguous signal level into a transformed code block selected from a subset of n-bit binary code words not including information code blocks, second detection means receptive of said first detection means output signals from said code transformation circuit for detecting transformed code blocks and developing a second control signal in response thereto, second storage means receptive of said first detection means output signals from said code transformation circuit for storing said first detection means output signals therein, an error detecting and correcting circuit connected to said second storage means and receptive of said second control signal for replacing said transformed code block with a correct information code block, and output means connected to said second storage means for providing corrected output signals.

2. In a communications system according to claim 1 wherein said first detection means comprises a threshold detector having a first and second threshold, said first threshold being greater than said second threshold, for developing said output signal corresponding to a binary one when said received signal level exceeds said first threshold, for developing said output signal corresponding to a binary zero when said received signal level is less than said second threshold, and for developing said output signal corresponding to said ambiguous signal when said received signal level is between said first and second threshold.

3. A communications system comprising a plurality of signal repeaters having a first signal repeater receptive of a transmitted signal, a sequence of repeaters receptive of an output signal from a previous repeater and a last repeater, said received signal being a sequence of bipolar digital characters having a positive polarity, a negative polarity and a zero level, said received signal being representative of Markov type information such that a first non-zero signal level digital character following a digital character having a positive polarity has a negative polarity, said last signal repeater comprising, first detection means receptive of said received signal for developing output signals corresponding to a positive and negative signal polarity and a zero signal level, second detection means receptive of said received signal for developing a control signal corresponding to an ambiguous signal ambiguous as to logic content thereof, a first and second mode memory for storing said output signals developed by said first detection means, circuit means connected to said first and second detection means and said first and second mode memory for developing an output signal under control of said control signal corresponding to said output signal developed by said first detection means during an absence of said control signal and corresponding to two successive signals representative of said received signal having two successive digital characters each having positive polarity when said control signal is applied to said circuit means memory means receptive of said output signal of said circuit means for storing said output signal therein a mode detecting and correcting circuit receptive of said output signal of said circuit means and connected to said memory means for detecting said two successive output signals representative of two successive digital characters each having positive polarity for correcting said output signal of said circuit means stored in said memory means according to transition rules of said Markov type information, and output means connected to said memory means for providing corrected output signals.

4. In a communication system according to claim 3 wherein said first detection means comprises, a threshold detector having a first and second threshold, said first threshold being greater than said second threshold for developing said output signal corresponding to a positive polarity when said received signal level exceeds said first threshold, for developing said output signal corresponding to a negative polarity when said received signal level is less than said second threshold, and for developing no output signal when said received signal level is between said first and second threshold, and wherein said second detection means comprises, a threshold detector having a first, second, third and fourth threshold, said first threshold being greater than said second threshold, said second threshold being greater than said third threshold, and said third threshold being greater than said fourth threshold, for developing said control signal when said received signal level is between said first and second threshold or when said received signal level is between said third and fourth threshold.

* * * * *